Figure 6:
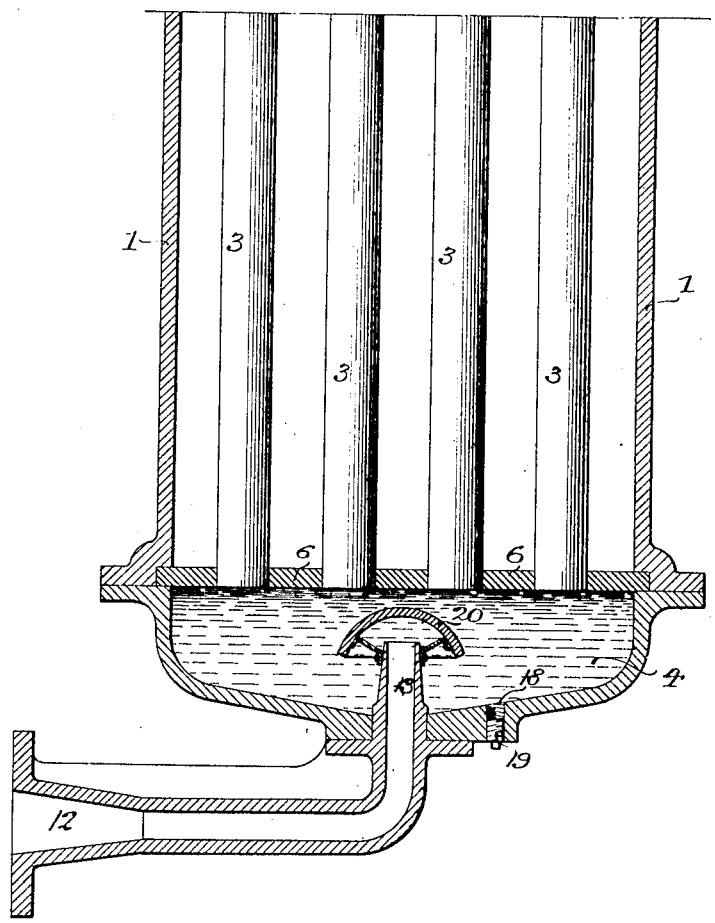

No. 882,322. PATENTED MAR. 17, 1908.
P. KESTNER.
APPARATUS FOR CONCENTRATING LIQUIDS.
APPLICATION FILED SEPT. 14, 1906.
2 SHEETS—SHEET 1.
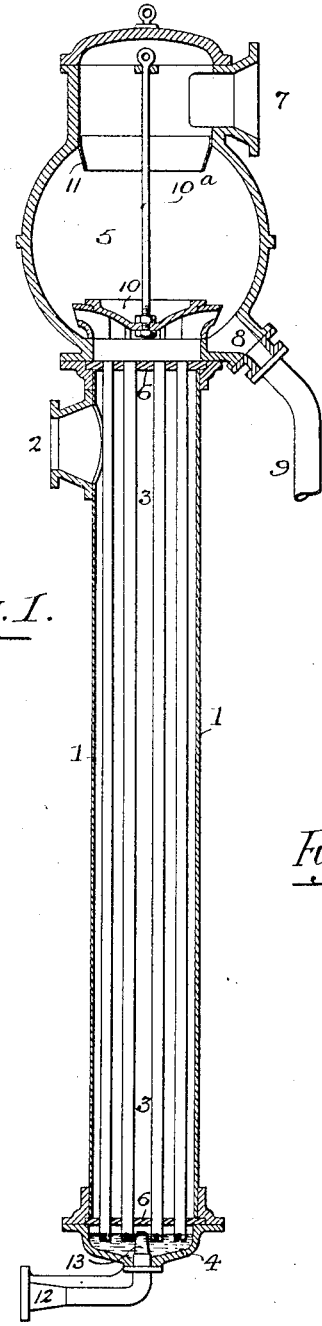
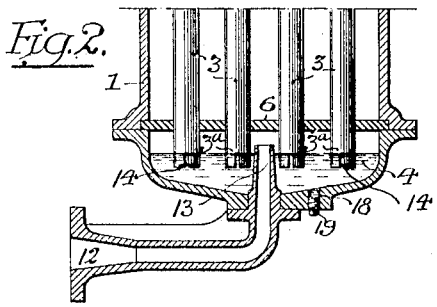
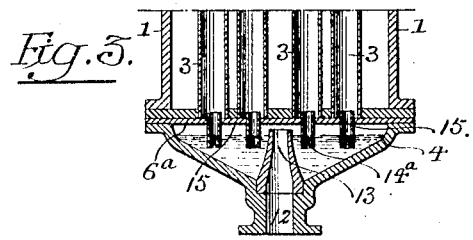
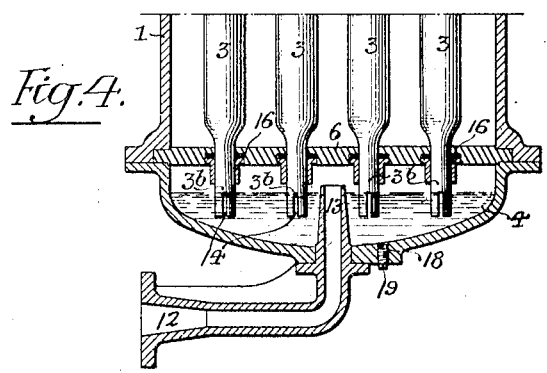
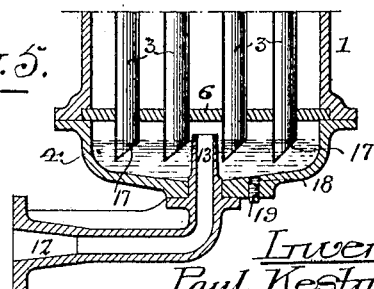
Witnesses:-
Inventor
Paul Kestner
by his Attorneys
Howson & Howson No. 882,322.

PATENTED MAR. 17, 1908.

P. KESTNER.
APPARATUS FOR CONCENTRATING LIQUIDS.
APPLICATION FILED SEPT. 14, 1906.

2 SHEETS—SHEET 2.

UNITED STATES PATENT OFFICE.

PAUL KESTNER, OF LILLE, FRANCE, ASSIGNOR TO KESTNER EVAPORATOR COMPANY, OF PHILADELPHIA, PENNSYLVANIA, A CORPORATION OF PENNSYLVANIA.

APPARATUS FOR CONCENTRATING LIQUIDS.

No. 882,322.     Specification of Letters Patent.     Patented March 17, 1908.

Application filed September 14, 1906. Serial No. 334,698.

*To all whom it may concern:*

Be it known that I, PAUL KESTNER, a citizen of the Republic of France, and a resident of Lille, Department Nord, France, have invented certain Improvements in Apparatus for Concentrating Liquids, of which the following is a specification.

My invention relates to concentrating apparatus of the type disclosed in my application for patent, filed December 31, 1902, Serial No. 137,292, and it comprises certain improved means for feeding the liquid to be concentrated to the sets of long vertical tubes in which evaporation is carried on.

My invention is fully shown in the accompanying drawings, in which:

Figure 1, is a vertical section of one element of an evaporating apparatus made in accordance with the invention forming the subject of my application for patent before referred to; Fig. 2, is a sectional view on an enlarged scale of the lower portion of the structure shown in Fig. 1; Fig. 3, is a similar sectional view showing another form of inlet pipe and illustrating a modification of my invention, and Figs. 4, 5 and 6, are sectional views similar to Fig. 2, illustrating further modifications of my invention.

The apparatus forming the subject-matter of my application before referred to, relates to that class of concentrators in which evaporation is carried on in tubes, and it consists of an improved form of such apparatus having vertical tubes of great length disposed within an inclosing shell to which heat is admitted to reduce the water content of the liquid under process of concentration. This apparatus is based upon a novel method of circulating the liquid to be concentrated whereby it is caused to rise within said tubes from a body of liquid fed to the bottom of the same, in a series of ascending films clinging to the inner surface of such tubes, such films being caused by the presence of steam from said liquid which carries the latter in a thin stream, in a more or less concentrated condition depending upon the number of effects the liquid has passed through, to the top of said tubes where the liquid is caught and may be passed to another structure employing a similar set of tubes or otherwise disposed of, and wherein the steam is passed through a separator whereby the liquid entrained therewith may be removed; the steam passing to the next effect or disposed of as may be desired.

My present improvement is for the purpose of remedying a more or less serious drawback that has been met with in these evaporators when it has been desired to work them in multiple effect. When working in multiple effect, the liquid passing from the separator at the top of one set of tubes to the receiving chamber at the bottom of the next set, undergoes a fall in pressure and temperature, which is necessarily accompanied by a somewhat large production of steam. This steam is produced at the precise moment when the fall in pressure takes place; that is to say, when passing through the valve regulating the admission of liquid to the feed chamber for the following set of tubes, and the production of steam is such that it represents a volume considerably greater than that of the liquid. The tendency of the steam to rush into the feed chamber at the bottom of the tubes prevents the even distribution of the liquid in each tube; a condition that is essential to the satisfactory working of an evaporating apparatus of this character.

In Fig. 1, of the drawings herewith, showing one effect of an evaporator made in accordance with the invention forming the subject-matter of my application before referred to, 1 represents a shell or casing forming a chamber to which steam is admitted at the inlet 2, for circulation around a series of evaporating tubes 3, through which the liquid passes from a receiving chamber 4 at the bottom of the shell or casing, to a separating chamber 5 at the top of the same. The shell or casing 1 is provided with upper and lower plates 6 to which the tubes are secured in any suitable manner that will be steam and water-tight, in order that there will be no danger of the liquid under process of concentration entering the steam chamber, or vice versa. The separating chamber 5 is provided with an outlet 7 for the steam generated within the evaporating tubes, and an outlet 8, communicating with a pipe 9, for the concentrated liquid. Mounted within this chamber is a separator 10 suspended by a rod 10ª from the upper part of the separating chamber 5, which serves to effect separation of the steam from the concentrated liquid, and a collar 11 in the upper part of the chamber serves to divert any liquid that may rise on the walls of the chamber. If the evaporating tubes 3 terminated at the lower tube plate 6, the liquid entering the receiving chamber 4 would be discharged directly against said tube plate at considerable speed, and on account of its very large volume, it would be precipitated in the direction of the tubes which happen to be situated immediately above the point of issue; causing in these tubes an active circulation, while in the other tubes there would be little, if any, circulation whatever. There exists no means of avoiding this drawback other than the separation of the steam and liquid under process of concentration and its even distribution in each tube, and this is effected, according to my present invention, in the following manner.

It will be noticed, in Figs. 1 and 2, that the lower ends of the evaporator tubes 3 instead of terminating at the lower tube plate 6, extend into the feed chamber 4 below the same, and the feed pipe 12 delivering the partially concentrated liquid has a nozzle 13 which also extends into said chamber and discharges above the inlet openings to said tubes. The extremities 3ª of the evaporating tubes 3 extending into said feed chamber are all of the same length, and they are provided with one or more slits 14 of the same length. The result obtained by this arrangement is at once apparent. The mixture of steam and liquid entering through the nozzle 13 of the feed pipe 12 hurls itself against the bottom tube plate 6 and brings about a separation of said mixture; the steam remaining at the top of the feed chamber and the liquid necessarily falling to the bottom. As the steam can only enter the tubes through the slits 14, and the top of the same being on the same level, each tube will necessarily receive the same amount of steam.

Fig. 3, shows substantially the same arrangement applied in a different manner. In this form of my invention the tubes 3 terminate at the lower plate 6, but a second plate 6ª carries a series of short tubular sections 15 registering with said tubes 3, and having slits 14ª, as in the structure shown in Figs. 1 and 2.

In Fig. 4, the tubes 3, instead of being expanded into the tube plate 6, have their ends reduced at 3ᵇ, such ends extending through said tube plate and being fixed thereto by means of stuffing boxes 16. These reduced ends 3ᵇ are provided with slits 14ᵇ.

In the form of my invention shown in Fig. 5, the slits are omitted and the ends of the tubes are beveled off at an angle as shown at 17; the steam being admitted uniformly at the upper edge of said bevel.

In each case the object aimed at is to create two spaces in the receiving chamber 4, one at the top for the steam, and the other at the bottom for the liquid, and to provide for an even distribution and admission of steam to each tube. Under these circumstances the production of steam, which cannot be avoided, instead of being a drawback, improves the working of the apparatus. The steam bubbles entering at the foot of each tube effect evaporation at once, which otherwise would not take place at the lower extremities of the tubes. The advantages of this arrangement are so well realized that even in the case of apparatus not working in multiple effect, that is to say, when the self generation of steam does not exist, it has been found advantageous to adopt this arrangement and in lieu of the steam generated spontaneously, to specially introduce steam for the purpose. Each receiving chamber 4 is provided with an aperture 18 for drainage and cleansing, normally closed by a plug 19.

In Fig. 6, I have shown a form of apparatus in which the tubes 3 terminate at the bottom plate 6. In this arrangement the inlet nozzle 13 is provided with a bell or hood 20 against which the incoming liquid is discharged with more or less velocity and by which such liquid is directed into the chamber 4. In this arrangement the steam space is omitted and as soon as the receiving chamber is filled with liquid, uniform feed to the pipes 3 is insured.

I claim:

1. In a vertical tube evaporator, the combination of a receiving chamber at the base of the tubes for the liquid under treatment, evaporating tubes leading upwardly from said chamber, portions of said tubes extending into the receiving chamber, and an inlet pipe for said liquid, said pipe having its discharge outlet within said receiving chamber at a point above the tube inlets.

2. In a vertical tube evaporator, the combination of a receiving chamber at the base of the tubes for the liquid under treatment, evaporating tubes leading upwardly from said chamber, portions of said tubes extending into the receiving chamber, an inlet pipe for said liquid, and a discharge nozzle carried by said pipe having its outlet within said receiving chamber at a point above the tube inlets.

3. In a tubular evaporator, the combination of a receiving chamber for the liquid to be concentrated, evaporating tubes leading from said chamber and having portions extending therein, said portions being slotted, and an inlet pipe for said liquid having its outlet above the upper margin of said slots.

4. In a tubular evaporator, the combination of a receiving chamber for the liquid to be concentrated, evaporating tubes leading from said chamber and having portions extending therein, said portions being slotted, an inlet pipe for said liquid, and a discharge nozzle for said pipe having its outlet above the upper margin of said slots.

5. In tubular evaporators, the combination of a series of vertical evaporating tubes, a receiving chamber for the liquid to be evaporated communicating with said tubes, the latter having slotted extensions extending into said receiving chamber, and a feed pipe for delivering liquid to said receiving chamber having its outlet extending above the inlet openings to said tubes.

6. In tubular evaporators, the combination of a series of vertical evaporating tubes, a receiving chamber for the liquid to be evaporated communicating with said tubes, the latter having slotted extensions extending into said receiving chamber, a feed pipe for delivering liquid to said receiving chamber, and a nozzle carried by said feed pipe and extending above the inlet openings to said tubes.

7. In a vertical tube evaporating apparatus, the combination of a series of long vertical evaporating tubes, means for heating the same, a receiving chamber for the liquid under treatment into which the lower ends of said tubes extend, and means for discharging liquid into said chamber at a point above the tube inlets whereby a separation of said liquid from accompanying steam may be accomplished and providing an even distribution of said steam and liquid to the inlet openings of the several tubes.

8. In a vertical tube evaporator, the combination of a steam casing, a series of evaporating tubes mounted therein, a receiving chamber at the bottom of said casing in communication with said tubes and into which the latter projects, slotted ends carried by said tubes within said chamber, and means for discharging the liquid under treatment into said chamber at a point above said slotted ends whereby the distribution of said liquid to the tubes will be uniform.

9. In evaporators of the long vertical tube type, the combination of the tubes, plates to which said tubes are secured, a cylindrical casing forming with said plates a steam space, a chamber for receiving and distributing the liquid under treatment exterior of said steam space and communicating with all of said tubes, slotted extensions carried by said pipes and projecting through the lower plate into said chamber, the height of said slots being the same in each case whereby a steam space is provided between the same and the top of said chamber in order that any steam entering said chamber may be separated from the liquid entering therewith and may be evenly distributed to said tubes, and means for discharging liquid into said chamber at a point above the inlet to said tubes.

10. In a vertical tube evaporator, the combination of a receiving chamber at the base of the same for the liquid under treatment, evaporating tubes leading from said chamber, an inlet pipe for discharging said liquid into the receiving chamber, and means for effecting an even feed of said liquid to the evaporating tubes.

11. In a vertical tube evaporator, the combination of a receiving chamber at the base of the same for the liquid under treatment, evaporating tubes leading from said chamber, an inlet pipe for discharging said liquid into the receiving chamber, said inlet pipe being centrally disposed with respect to said receiving chamber and discharging in an upward direction, and means for effecting an even feed of the liquid to the several tubes.

In testimony whereof I have signed my name to this specification in the presence of two subscribing witnesses.

PAUL KESTNER.

Witnesses:
CHARRIE PEIN,
LÉON PECKEL.